United States Patent [19]

Hanzawa

[11] Patent Number: 5,506,661
[45] Date of Patent: Apr. 9, 1996

[54] IMAGE FORMING APPARATUS

[75] Inventor: Hiroshi Hanzawa, Tsuchiura, Japan

[73] Assignee: Riso Kagaku Corporation, Tokyo, Japan

[21] Appl. No.: 309,191

[22] Filed: Sep. 20, 1994

[30] Foreign Application Priority Data

Oct. 5, 1993 [JP] Japan .................... 5-249451

[51] Int. Cl.⁶ .................................. G03G 21/00
[52] U.S. Cl. .................... 355/209; 355/311; 364/464.01; 377/14; 377/16
[58] Field of Search .................. 355/308, 311, 355/202, 203, 204, 209; 377/8, 13, 14, 15, 16; 364/464.01

[56] References Cited

U.S. PATENT DOCUMENTS

| 5,117,258 | 5/1992 | Iwata | 355/308 X |
| 5,146,344 | 9/1992 | Bennett | 355/202 X |
| 5,383,129 | 1/1995 | Farrell | 355/308 X |

OTHER PUBLICATIONS

Patent Abstracts of Japan, vol. 10, No. 358 (P-522) Dec. 2, 1986 Minolta Camera Co., Ltd., Pat. Date: Jul. 15, 1986 for JP-A-61 156 055.

Patent Abstracts of Japan, vol. 14, No. 434(P-1107) Sep. 18, 1990 Toshiba Corp. Pat. Date: Jun. 29, 1990 for JP-A-02 170 169.

Primary Examiner—R. L. Moses
Attorney, Agent, or Firm—Kanesaka & Takeuchi

[57] ABSTRACT

An image forming apparatus for forming image information corresponding to an image of original document on recording sheets includes a sheet size sensor device for detecting the size of the recording sheets, a counter device for counting the number of pages of the recording sheets on which image information has been recorded, a memory device for storing data of printing charge per sheet according to the size of the recording sheets, calculating device for calculating printing charges based on data of the number of pages of the printed sheets counted by the counter device and data of the printing charge per sheet corresponding to the size of the recording sheets detected by the sheet size sensor means, and a display means for display the calculation results calculated by said calculating device.

6 Claims, 8 Drawing Sheets

```
Unit price registration

Unit price for A3 / B4
  Unit price for A4 / B5

Return to previous menu select an item and press enter key
```

FIG. 6

```
Unit price registration (A3 / B4)

for   20 -   49 pages:    10 yen
      for   50 -   99 pages:     9 yen
      for  100 -  499 pages:     8 yen
      for  500 -  999 pages:     7 yen
      for 1000 -      pages:     6 yen
      for       postcards:      25 yen
      for others:     pages:        yen Return to previous menu enter unit price from keypad
(select previous menu when finished)
```

FIG. 8

```
Totalization of plain paper printing
    Size         Count        Total
    A3             0          0 yen
    B4             0          0 yen
    A4          1000       8000 yen
    B5             0          0 yen
    Postcards      0          0 yen
    Others         0          0 yen
                            ─────────
    Total                  8000 yen End
   Return to previous menu
select End or Return to previous menu
and press enter key
enter prices for Others from keypad
```

```
Wholesale management

Today's sales
 Sales of this month
 Yesterday's sales
 Sales of last month

Return to previous menu select End or Return to previous menu
and press enter key
```

FIG. 11

```
Today's sales:    (August   03)
     Size        Count        Total
     A3            0           0 yen
     B4          2500       1500 yen
     A4         13000       6500 yen
     B5            0           0 yen
     Postcards     0           0 yen
     Others        0           0 yen
                             ─────────
     Total                  8000 yen End
   Return to previous menu select Return to previous menu and press
enter key
```

F I G . 1 2

```
Today's sales:     (August    03)
    Size         Count         Total
     A3           100         800 yen
     B4          2500        1500 yen
     A4         13000        6500 yen
     B5             0           0 yen
     Postcards      0           0 yen
     Others         0           0 yen
                              ─────────
    Total                    8800 yen End
   Return to previous menu
select Return to previous menu and press
enter key
select an item and press enter key
```

IMAGE FORMING APPARATUS

BACKGROUND OF THE INVENTION

The present invention relates to an image forming apparatus for forming image information corresponding to its original image on recording sheets, more specifically to an image forming apparatus for allowing copy fee or printing fee at the store installing the apparatus therein to be automatically calculated and displayed.

Recently, the number of copy or printing shops for serving copying or printing by using electrophotographic copy machines or mimeographic printing machines has been increased in convenience stores and stationary stores.

The image forming apparatus corresponding to these purposes of the prior art are provided with a mechanical key-counter for enabling the use of the apparatus by attaching therein. Once copying or printing is completed, the copy or print fee is calculated based on the data of the number of printed sheets and the unit price per sheet for the size of recording sheets.

The fare adjustment may be easy when the printed sheet size is limited to one or two. However, in case that a plurality of different sizes of recording sheets has been used, the calculation of the printing charge may be a bothering job, and may result in the problem of frequent calculation errors.

SUMMARY OF THE INVENTION

Therefore, an object of the present invention is to provide, by considering the aforementioned problems, an image forming apparatus for automatically calculating and displaying the printing charge for each of different sizes of recording sheet used for printing or copying.

The image forming apparatus according to a first aspect of the present invention comprises an image forming apparatus for forming image information corresponding to its original images onto recording sheet P, including sheet size sensor means 48 for detecting the size of said recording sheet, counter means 52 for counting the number of pages of the recording sheets on which image information has been recorded, memory means 79 for storing data of the printing charge per sheet for said size of recording sheet, calculating means 77 for calculating printing charges based on data of the number of the printed sheets counted by said counter means and data of printing the charge per sheet corresponding to the size of the used recording sheets detected by said sheet size sensor means, and display means 74 for displaying the result of the calculation by said calculating means.

The image forming apparatus according to a second aspect of the present invention comprises the image forming apparatus according to the first aspect, wherein the printing charge per sheet corresponding to the size of the recording sheets which is stored in said memory means 79 may be easily modified by the operation of input means 70.

The image forming apparatus according to a third aspect of the present invention comprises the image forming apparatus according to the first aspect, wherein the number of the printed pages of the recording sheets and said charge data for each recording sheet sizes are accumulated and stored in said memory means 79 for a predetermined period of the time, and the total amount of the printing charge for said predetermined period of time is displayed on display means 74 by instructing from said input means 70.

The image forming apparatus according to a fourth aspect of the present invention comprises an image forming apparatus for forming image information corresponding to its original images onto recording sheet P, including sheet size sensor means 48 for sensing the size of recording sheets, counter means 52 for counting the number of printed pages of the recording sheets on which image information has been reproduced, memory means 79 for storing data of preset printing charge per page according to the size of said recording sheets for the predetermined range of the number of pages of the printing sheets, calculating means 77 for calculating charges based on data of the number of pages of the printed sheets counted by said counter means and on data of the printing charge per page according to the size of said recording sheets counted by said counter means and preset for the predetermined range of the number of printing pages, and display means 74 for displaying the results of calculation carried out by said calculating means.

In accordance with such arrangements as mentioned above, the size of recording sheets P can be detected by sheet size sensor means 48, and the number of printed pages of the recording sheets P can be counted by counter means 52. Calculating means 77 may read printing charge per sheet for the size of the recording sheet detected by printing sheet size sensor means 48 from memory means 79, and calculate respective amount of printing charges by means of data of printing fee and the counted number of pages of the printing sheets to display total amount of printing charge onto display means 74.

Also, data of the printing charge per page according to the size of printing sheet stored in memory means 79 can be modified by using input means 70.

Further, calculating means 77 accumulates and stores in said memory means 79 data of the number of printed pages for each of the sizes of said printing sheets and of the printing charge for a predetermined period of time, and displays total amount of charge for each of said predetermined period of time onto said display means 74.

In addition, it is also possible that said memory means 79 stores the preset printing charge per page according to the size of printing sheets for the predetermined range of the number of printed pages, and that calculating means 77 calculates the total amount of charge based on data of the number of printed pages counted by said counter means 52 and the preset printing charge according to the size of printing sheets detected by said sheet size sensor means 48 for a predetermined range of the number of pages of printing.

DETAILED DESCRIPTION OF THE INVENTION

Figure 1:
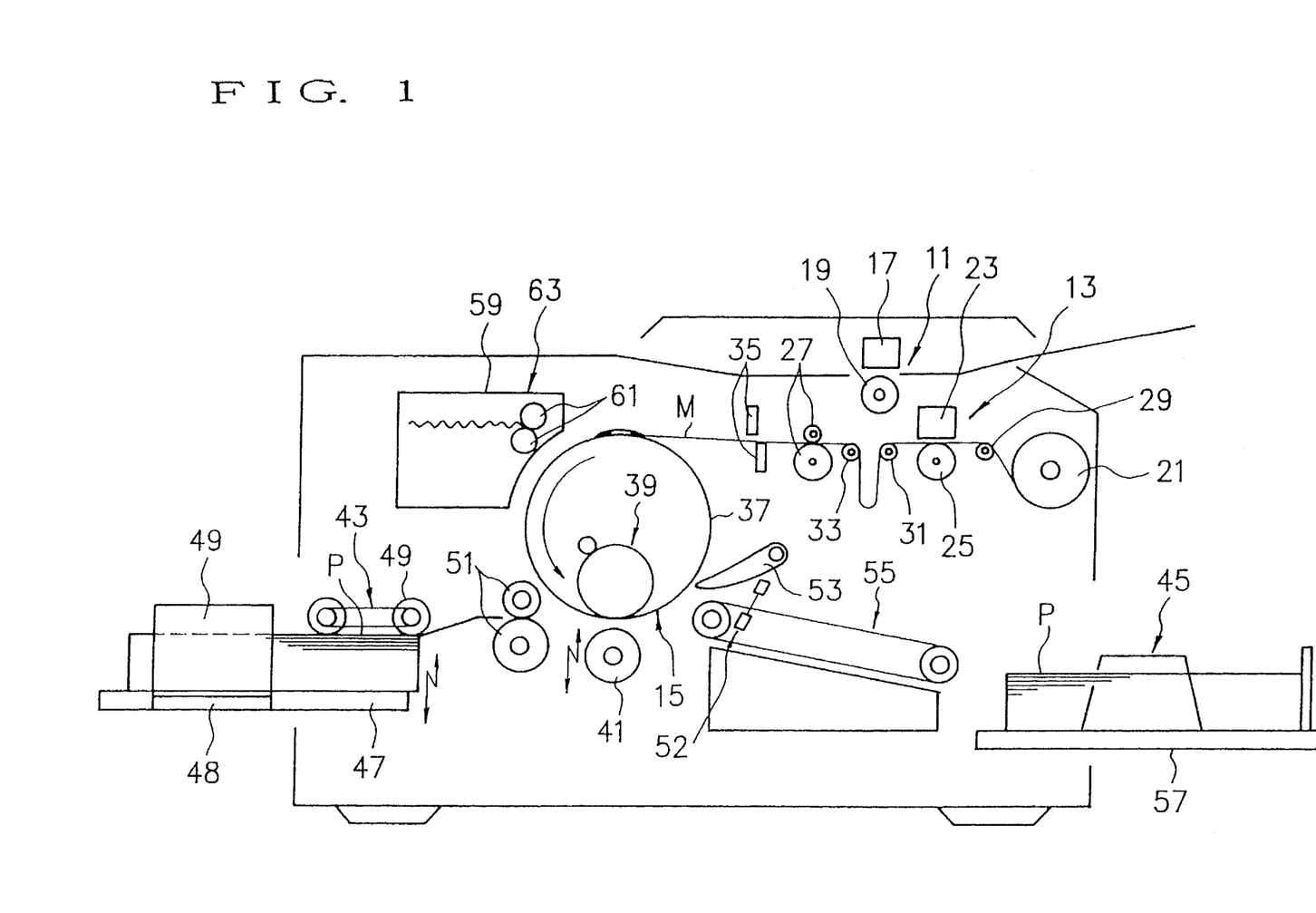
FIG. 1 is a schematic side view showing a mimeographic printing apparatus, which is one embodiment of the image forming apparatus according to the present invention.

Now referring to FIG. 1, there is shown a side view of an mimeographic printing apparatus with stencil master make-up function of one preferred embodiment of the image forming apparatus according to the present invention. The mimeographic printing apparatus with stencil master make-up function as shown in FIG. 1 has an original document reader 11, a stencil master make-up station 13, and printing station 15.

The document reader 11 includes line-image sensor 17 for reading images of original documents fed toward the one of scanning directions, and document feeder roller 19.

The stencil master make-up station 13 includes roll stencil master station 21; thermal head 23 comprised of a plurality of spot heaters arranged in lateral lines; roll paper feeder rollers 25 and 27; roll stencil master guide rollers 29, 31, and 33; roll stencil master cutter 35. Each of a plurality of spot heaters of thermal head 23 may be heated separately and individually to make thermally a plate in a dot-matrix manner with thermal mimeographic stencil master M, and then the one page of mimeographic stencil master M may be cut by cutter 35 after the stencil master plate-making.

The printing station 15 has an ink transmission drum 37 of pored structure, an ink supply unit 39 arranged within the drum 37, and press roller 41. A mimeographic stencil master M will be wound around the circumference of the drum 37 after stencil master plate-making.

The printing station 15 provides paper feeder 43 at one side and paper discharge unit 45 at the other side, respectively.

The paper feeder 43 includes paper feed base 47 for stacking recording sheets thereon, paper feed roller 49 for picking up sheets one by one from paper feed base 47, and timing roller 51 for charging recording paper P into the nip between drum 37 and press roller 41.

The paper size sensor means 48 is provided on the paper feed base 47 for sensing the size of printing sheets.

This paper size sensor means 48 may be accomplished by various methods, including a method of sensing the paper size of the recording sheets P by sensing the position of fence 49 provided at both sides of paper sheets P with potentiometer, or a method of sensing the paper size of the recording sheets by providing a plurality of sensors on the paper feed base 47 to detect by means of the detection area of sensors, and the like.

In addition, a cassette (not shown) for recording sheets P may be removably attached on the paper feed base 47, or a plurality of cassettes for each size of the recording sheets P may be provided with the type of cassettes being detected by the paper size sensor means 48.

Paper discharge station 45 has stripping fingers 53 for peel-off recording sheets P from drum 37, and transport device 55 for transporting recording sheets P stripped from drum 37 to the stacker that will be described herein below. The paper discharge station 55 also has a stacker 57 for stacking printed recording sheets P thereon at the end of downstream.

At the paper discharge station there is provided a paper discharge sensor 52 for detecting whether or not the recording sheet P is reliably peeled off from the drum 37 and whether or not it is transported to the stacker 57. The number of printed pages of the recording sheets P (the number of printing) will be counted by using the sensor signal from this paper discharge sensor 52 for output data of the number of pages of the printed sheets (printed page data).

At one side of the printing station 15, stencil master discharge station 63 is provided for peeling off a used mimeographic stencil master M from the drum 37 to send it into waste box 59.

In this mimeographic printing apparatus, the drum 37 is driven by drive means (not shown) to revolve in the counterclockwise direction on the figure around the center axis of the drum itself. Recording sheets P are fed by the timing roller 51 into the nip between the drum 37 and the press roller 41, from the left hand to the right hand in FIG. 1, at a given timing synchronized with the rotation of the drum 37. Recording sheets P are forced by the press roller 41 to be pressed to the mimeographic stencil master M wound at the circumference of the drum 37 so that the mimeographic printing to the recording sheets P will be accomplished.

Printed sheets P are peeled off from the drum 37 by peel-off finger 53 to transport to stacker 57 by discharging device 55, and stacked on the stacker 57 with its printed face up.

Figure 2:
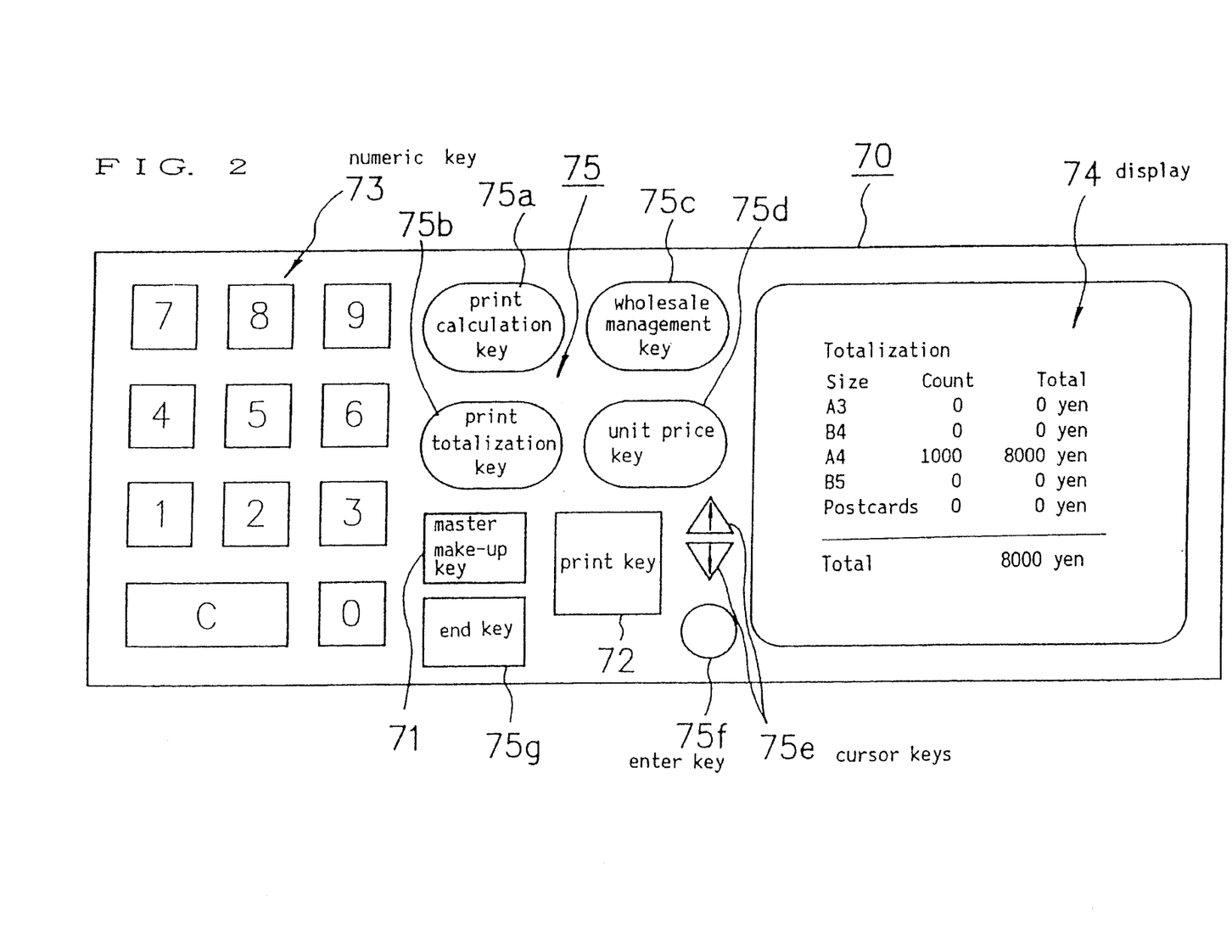
FIG. 2 is an instruction panel of a mimeographic printing apparatus.

FIG. 2 illustrates an instrument panel of a mimeographic printing apparatus.

On the instrument panel 70 as an input means, a stencil master make-up key 71 for making up said mimeographic stencil master, and a printing key 72 for printing are provided. The number of pages of printing may be preset with numeric key 73.

In the display area 74, various messages for helping the operation of the panel are displayed. In the management mode discussed below, the management information will be displayed as shown in the figure.

In this management mode, a plurality of control keys 75 described below will be used. These control keys 75 comprises a print calculation key 75a for instructing the calculation of printing charge, a print totalization key 75b for instructing to display calculated printing charge on the display 74, a wholesale management key 75c for instructing to display the number of pages of the printed pages and the printing charge within a predetermined period of time, a unit price key 75d for inputting printing charge per sheet for a predetermined range of the number of pages of the recording sheets according to the sheet size, cursor keys 75e for moving a cursor to select a desired menu from a plurality of menus displayed on the display 74 in accordance with the operation of any of these keys, an enter key 75f for selecting a menu pointed by the cursor by moving the cursor with said cursor keys 75e, and an end key 75g for instructing the end of each printing process. The mode setting and canceling for calculating printing charge are toggled by operating said print calculation key 75a.

Figure 3:
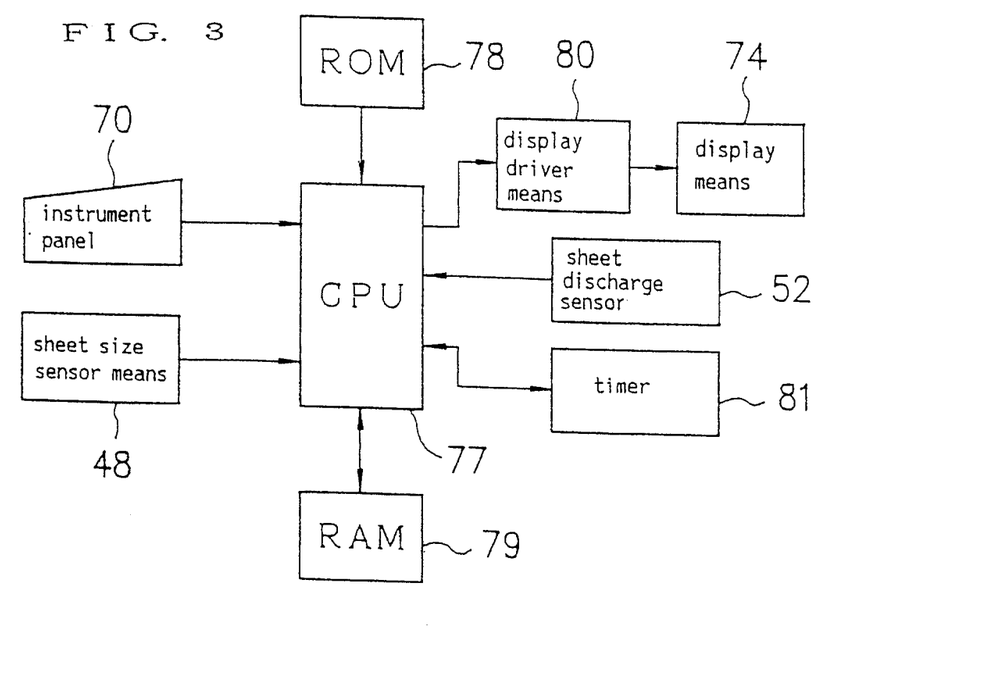
FIG. 3 is a block diagram showing the arrangement of electric circuitry of a mimeographic printing apparatus.

FIG. 3 illustrates the arrangement of an electric circuitry in a mimeographic printing apparatus.

CPU 77 is calculation means, which controls and manages the printing sequence of each part of the apparatus by using ROM 78 in which control program is stored. In the management mode, CPU 77 calculates various calculations of each management item.

An item selected and entered from the instrument panel 70 and sheet size data corresponding to the size of sheets from the sheet size sensor means 48 are input to CPU 77.

Also, data of the number of pages of the printed sheets from the sheet discharge sensor 52 are sent to CPU 77 when printing. Signals designating the date and the like are sent from timer 81.

RAM 79 is storage means, which is used as the working space for CPU 77 and stores various data such as unit price of printing, number of pages of the printed sheets, and size of the printing sheets used, as well as the total number of pages of the printed sheets and the total printing charge within each of predetermined periods of time.

Display data when printing and management data in the management mode will be displayed on said display 74 by driving the display with display driver means 80.

The operation in the management mode with the arrangement as noted above will be described below. The apparatus will be set to this management mode by pressing any one of control keys 75.

In the management mode, printing charge per page for each of the different sheet size and the predetermined ranges of the number of pages of the recording sheets is registered to calculate the amount of charge by using the number of pages of actually printed sheets. The number of pages of the printed sheets are totalized for each of given period of time, for example, by date. The printing charges are also totalized for each of given period of time.

The unit price may be entered by shifting mode to the unit price registration mode by using the unit price key 75d.

Figure 4:
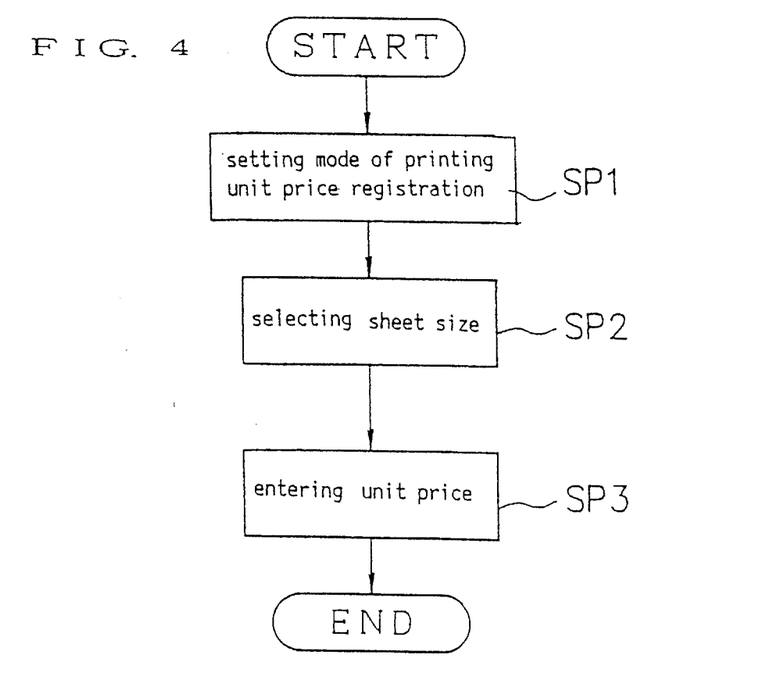
FIG. 4 is a flow chart showing the operation of registration of unit prices.

The unit price registration key 75d allows the operator to preset unit price of printing for each of different size of sheets. FIG. 4 is a flow chart showing the operation of this unit price registration.

Figure 5:
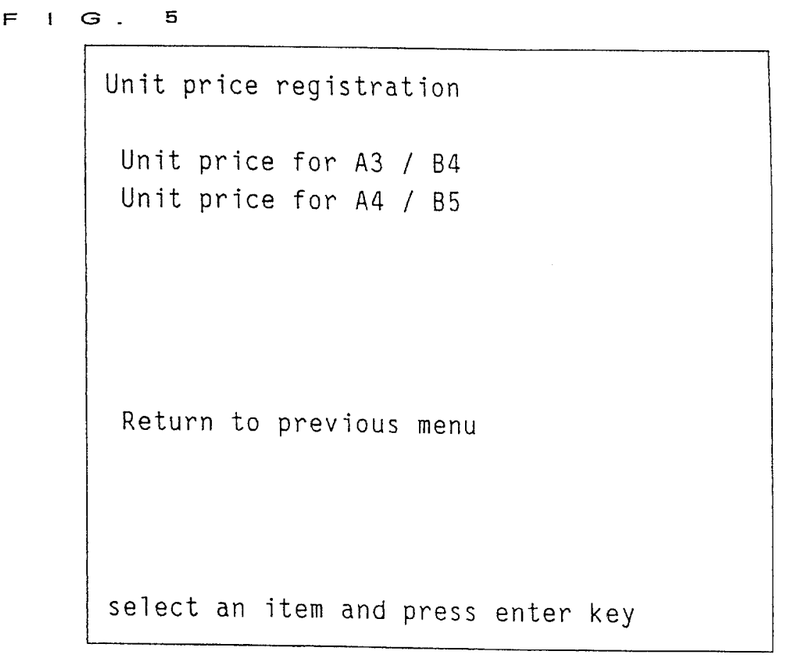
FIG. 5 is a schematic diagram showing a display for the registration of unit prices.

By pressing the unit price registration key 75d, a unit price registration mode is set (SP1), and a setting screen for each type of sheets will be displayed on the display 74, as shown in FIG. 5.

For setting the registration for A3/B4 size of papers in this screen, the operator has to move a cursor to the appropriate menu with cursor keys 75e and hit enter key 75f to select it (SP2).

Figure 6:
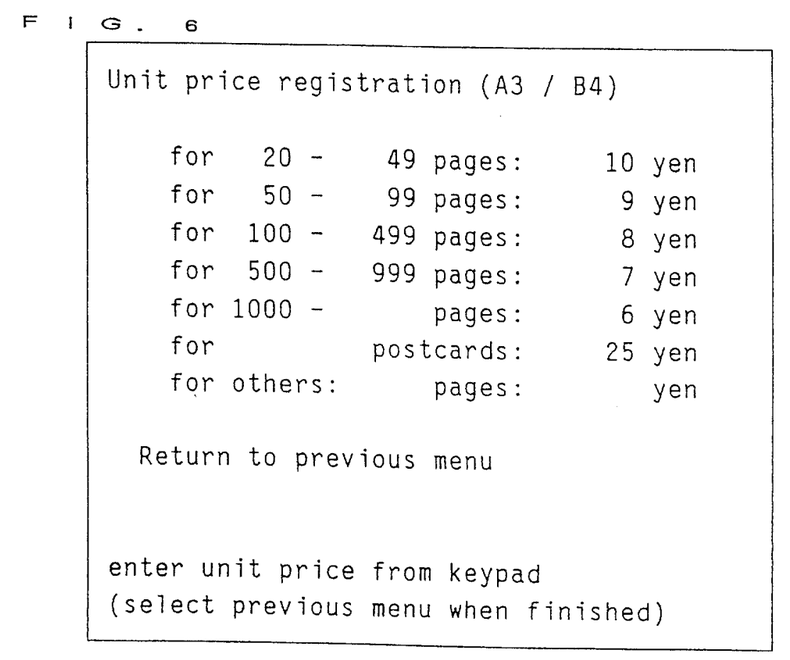
FIG. 6 is a schematic diagram showing a display for input of unit price.

As shown in FIG. 6, unit price input screen will be displayed on the display 74.

As shown, unit price may be preset separately and individually for each of the given ranges of the number of pages of printing sheets. Settings may be done by using the numeric key 73. For example, as shown in FIG. 6, the unit price of the range from 20 to 49 sheets may be set to 10 yen. Then, by using cursor keys 75e and key 73, unit prices for each of the ranges of the number of pages of the recording sheets may be set in the same manner. The input of unit price can be done for every range and size of printing sheets. The entered data of printing fee will be stored in a specific location within RAM 79.

The screen displayed on the display 74 has a menu structure so as to be able to return to the starting screen by choosing a menu entitled "Previous menu".

It should be noted that some default unit prices may be preset as factory settings to allow users to optionally change settings as required.

Figure 7:
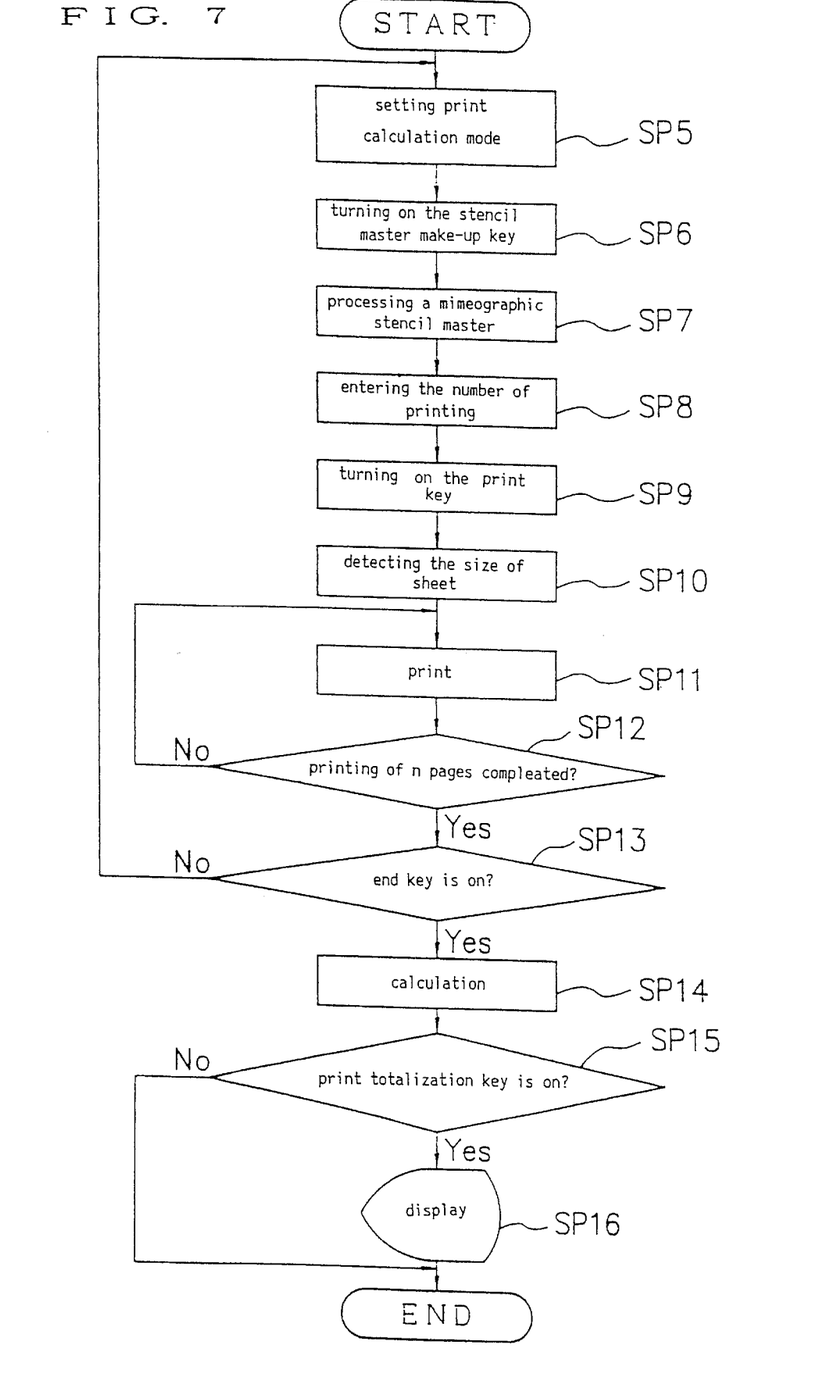
FIG. 7 is a flow chart showing the operation of the print calculating mode.

FIG. 7 is a flow chart illustrating the printing operation of the apparatus of the present invention.

Print calculation key 75b is latched to turn on and off by pressing thereon.

When the print calculation key 75b is on, the apparatus is set to print calculation mode to calculate printing charge according to the number of pages of printed sheets (SP5). When the print calculation key 75b is off, the printing is done without said calculation associated with printing.

The printing operation when the print calculation mode is on will be described below. The print calculation mode is used for the confirmation of the current status (number of pages to be printed and its printing charge) when the operator uses this apparatus.

By pressing print master key (SP6), document reader 11 reads an original document to make up thermal mimeographic stencil master M at make-up station 13, while master discharge station 63 peels off from the drum 37 the previous master wound around the drum to waste it into waste basket 59. Then the stencil master M which is just made up is wound to the circumference of the drum 37 at printing station 15 (SP7).

Then the number of pages to be printed is set from numeric key 73 (SP8). When the print key 72 is pressed (SP9), the size of recording sheets P on the sheet feeder 47 will be detected by sheet size sensor means 48 (SP10), and the printing will be continuously processed for the given number (SP11).

The data of the number of pages of printing entered from key 73, as well as the data of the sheet size of the recording sheet P detected by the sheet size sensor means 4a are both stored in RAM 79. CPU 77 receives the signal from sheet discharge sensor 52 indicating that the printed sheets P have been passed through paper discharge unit 55, to count the number of pages of printed sheets. CPU 77 compares data of the number of pages of printing stored in RAM 79 with this counted data so as to command the printing operation until these data match.

When the given number of pages of printing has been completed (SP12/Yes), and the end key 76 is pressed (SP13), CPU 77 calculates the printing charge (SP14) based on data of the number of pages of printed sheets and data of the sheet size detected by sheet size sensor means 48 and stored in RAM 79, in reference with unit price data for the given number of pages of printing also registered in RAM 79 to store the results of calculation in RAM 79.

The totalized data of the printing charge and the number of printed pages for given recording sheets will be accumulated to the totalized data for a predetermined period of time stored in a specific location in RAM 79. At this time, based on the timing data from timer 81, the totalized data are determined to which area the totalized data are accumulated in RAM 79.

The number of pages of printed sheets in the previous session and the results of calculation of the printing charge based on that number of pages of printed sheets are stored in RAM 79 until the end key 75g is pressed. That is, when the operator wishes to print on another sheet size successively, or to print or make stencil master from other original documents, the operator has to repeat printing sequence from SP8 to SP12 for other paper size, or to repeat stencil make-up and printing sequence from SP5 to SP12 for other documents without pressing the end key 76 at each sequence, and then to press the end key 75g so that the calculation of the number of pages of printed sheets for each size of recording sheets and the calculation of the printing charge according to the counted number of pages of printed sheets will be done at once.

Next, when pressing the print totalization key 75b (SP15), the data of the number of printed pages from the totalized data stored in RAM 79 and data of the printing charge based on that data of the number of printed pages stored in RAM 79 will be displayed on the display 74 by activating display drive means 80 (SP16).

Figure 8:
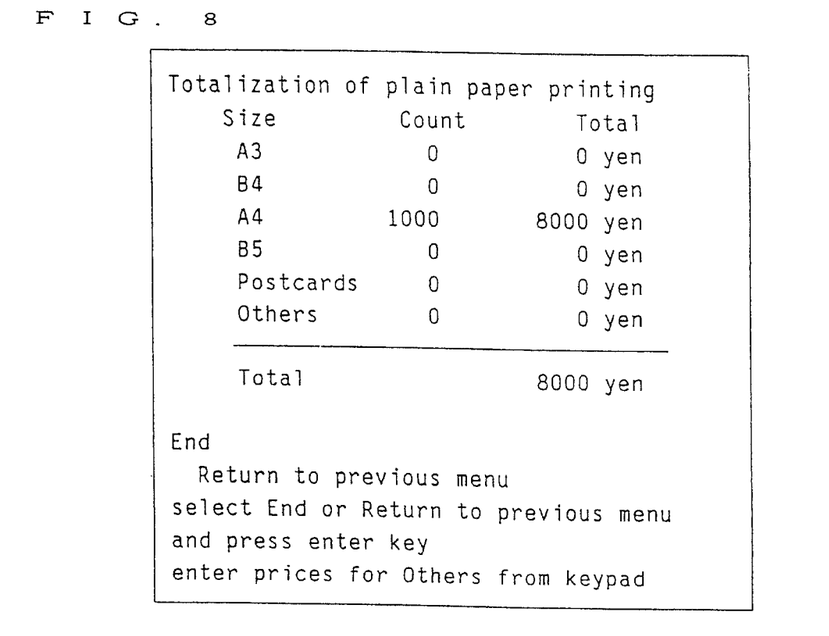
FIG. 8 is a schematic diagram showing a totalization display.

FIG. 8 shows one example of the totalization screen displaying totalized data.

As shown in this totalization screen, the sheet size of the recording sheets P, and the number of printed sheets are displayed. At the same time, the unit price per sheet for that range of the number of pages of printing and the printing charge calculated from that data are also displayed.

If the printing on other sheet size or stencil make-up and printing from other documents were done continuously, the totalization screen will display these results at the same time. The total amount of printing charge will be calculated and displayed at the bottom of the screen.

The print totalization key 75b may also be latched to turn on and off by pressing thereon.

It is noted that the results of calculation can be automatically displayed on the totalization screen (SP15) when the printing is done while the apparatus is set to print calculation mode (SP5), regardless of the pressing of the print totalization key 75b.

The totalization screen may be switched or turned off by selecting "Close" or "Previous screen" by means of cursor key 75e on the screen.

The operation as mentioned above is assumed to be done with one operator. As discussed above, the totalization of past operation is stored as the accumulation of each of the period of time.

Figure 9:
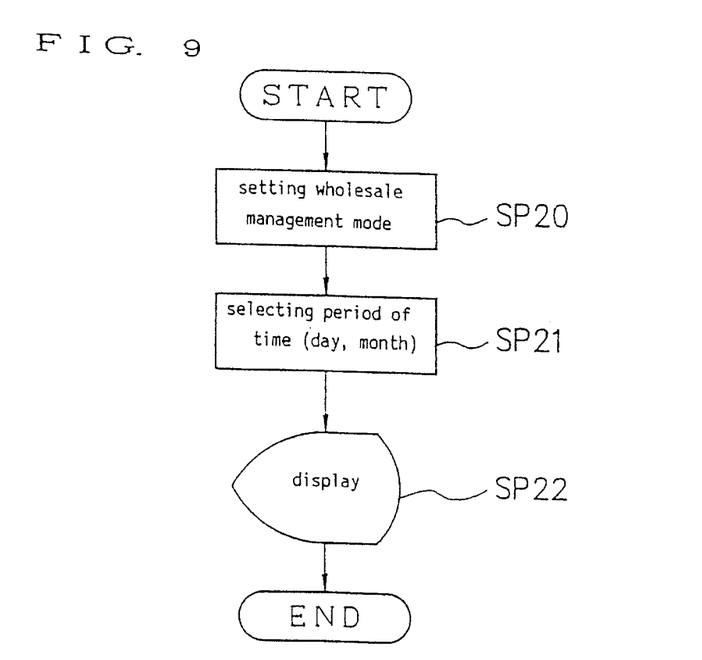
FIG. 9 is a flow chart showing the operation in the wholesale management mode.

Next, referring to the flow chart shown in FIG. 9, the wholesale management mode for managing these totalized information will be discussed below. The wholesale management mode is used for the owner or the manager of the apparatus to check to see the operation of the apparatus.

Figure 10:
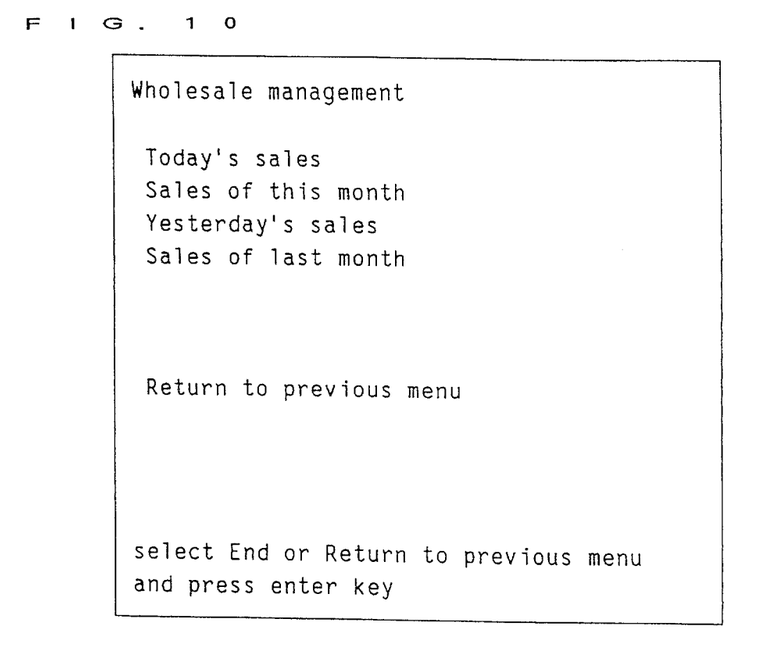
FIG. 10 is a schematic diagram showing a display for setting for the wholesale management.
Figure 11:
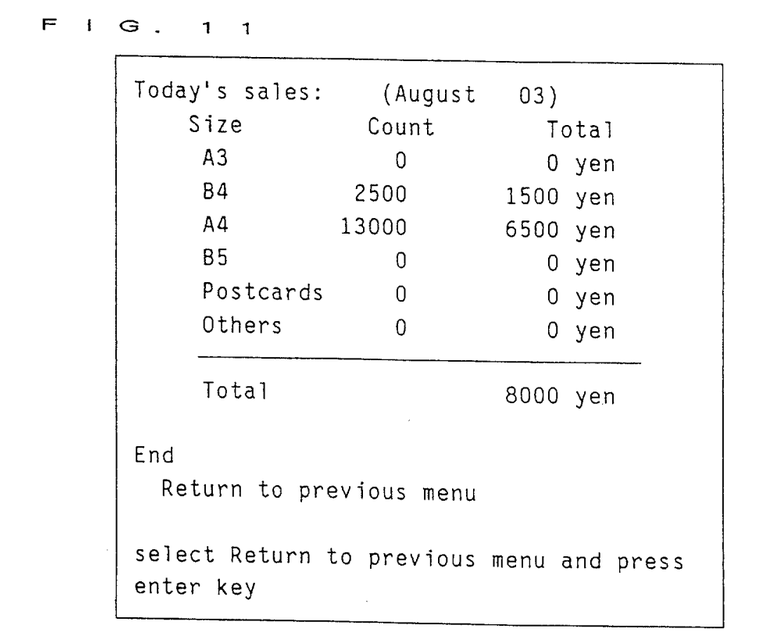
FIG. 11 is a schematic diagram showing a display of wholesale.

The apparatus is set to the wholesale management mode by pressing wholesale management key 75c (SP20). The screen for selecting a period of time is displayed on the display 74 (SP21) as shown in FIG. 10. By using cursor keys 75e on the screen to select "Today's sales" as the period of time, CPU 77 will read totalized data for that period of time from RAM 79 storing the totalized data corresponding to that period of time, and drive the display drive means 80 to display on the display 74 "Today's sales" as shown in FIG. 11 (SP22).

Figure 12:
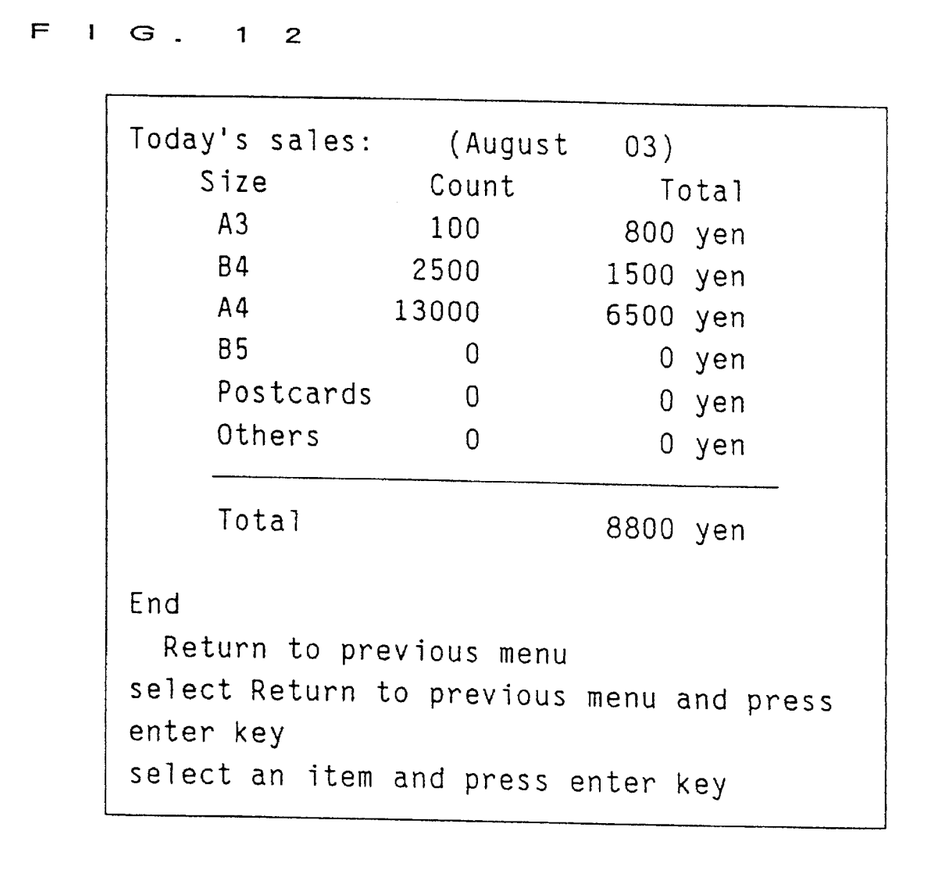
FIG. 12 is a schematic diagram showing another display of wholesale.

Similarly, by selecting "Sales of the month" as the selected period of time, "Sales of the month" will be displayed on the display 74 as shown in FIG. 12.

The selection of the predetermined period of time may be organized so as to totalize the data by time of day, or by date.

The preferred embodiment discussed above calculates a printing charge from the number of pages of printed sheets to display the results on the display 74. Since the mimeographic printing apparatus with stencil master make-up function can make a mimeographic stencil master M for each of original documents, if it is desirable to display the printing charge including the charge for used stencil masters, the number of pages and the charge corresponding thereto may be displayed on the display 74 by storing the unit price for one stencil master in RAM 79 and counting the number of pages of mimeographic stencil masters to calculate the charge from this count data and unit price data.

The present invention has been discussed with one preferred embodiment as a mimeographic printing apparatus with stencil master make-up function, it will be apparent to those skilled in the art that it may be used for any of electrophotographic printing apparatus.

According to the first aspect of the present invention, as the apparatus is arranged so as to detect the size of recording sheets for recording images by sheet size sensor means, and to count the number of pages of the recording sheets on which images are recorded, as well as to store printing charge data per sheet according to the size of recording sheets, and as the calculating means is arranged so as to calculate by using the printing charge data per sheet and data of printed page counted to display the calculated charge on display means, the operator may readily check to see the charge for the size of used recording sheets.

Also, the calculation of printing charge may be accomplished without error even if different sizes of recording sheets are used.

According to the second aspect of the present invention, as the unit price for each of the given size and number of pages of the recording sheets may be readily modified by using input means, the printing charge per sheet may be freely modified.

According to the third aspect of the present invention, as the number of pages and the charge of the printed sheets of past printing jobs are accumulated, by simply specifying a desired period of time, the number of pages and the charge of printed sheets corresponding to that period of time may be obtained, so that the manager of the apparatus may manage the wholesale with the apparatus.

According to the fourth aspect of the present invention, as the apparatus of the present invention is arranged so as to store printing charge per sheet preset for a predetermined range of the number of pages of printing sheets according to the size of the printing sheets, and to calculate by calculating means a printing charge based on data of the number of pages of the printed sheets counted by said counter means and on data of the printing charge per sheet according to the size of the recording sheets, a printing charge per sheet may be preset according to the range of the number of pages of printing, so that the printing charge according to the number of pages of the printed sheets may be obtained.

What is claimed is:

1. An image forming apparatus for forming image information corresponding to an image of an original document on recording sheets, comprising:

timer means for counting predetermined terms continuously, sheet size sensor means for detecting a size of said recording sheets, counter means for counting the number of pages of the recording sheets on which the image information has been recorded, first memory means for storing data of printing charge per sheet according to the size of said recording sheets, calculating means connected to the timer means, sheet size sensor means, counter means and first memory means, said calculating means calculating printing charges for each usage based on data of the number of pages of the printed sheets counted by said counter means and data of the printing charge per sheet corresponding to the size of the recording sheets detected by said sheet size sensor means, said calculating means also calculating a total number of pages of the printed sheets and total printing charges for each predetermined term based on the timer means, and display means for selectively displaying calculation results for said each usage and said total number of pages and said total printing charges for the predetermined term calculated by said calculating means.

2. An image forming apparatus as set forth in claim 1, wherein the printing charge per sheet according to the size of the recording sheets stored in said memory means can be modified by entering data from input means.

3. An image forming apparatus as set forth in claim 1, further comprising second memory means for memorizing the total number of pages of the printed sheets and the total printing charges, said second memory means having a plurality of areas, each area memorizing said total number of pages and the total printing charges in each term set by the timer means, said display means displaying the total number of pages of the printed sheets and the total printing charges in a selected term from said terms memorized in the second memory.

4. An image forming apparatus as set forth in claim 3, wherein said predetermined term is selected from the group consisting of hour, day and month.

5. An image forming apparatus for forming image information corresponding to an image of an original document on recording sheets by a mimeographic printing system, comprising:

a stencil forming section for forming a stencil based on the image information corresponding to the image of the original document, a printing section for providing a mimeographic printing on the recording sheets by the stencil prepared at the stencil forming section, sheet size sensor means for detecting a size of the recording sheets, printed sheet counting means for counting the number of printed recording sheets printed at the printing section, stencil counting means for counting the number of formed stencil prepared at the stencil forming section, calculating means connected to the sheet size sensor means, printed sheet counting means and stencil counting means, said calculating means calculating printing charge based on the number of the printed recording sheets counted by the printed sheet counting means and data of printing charge per sheet corresponding to the size of the recording sheet detected by the sheet size sensor means, and stencil forming charge based on the number of used stencils counted by the stencil counting means and data of stencil charge per one stencil, and display means for displaying calculation results of the printing charge and the stencil forming charge calculated by the calculating means.

6. An image forming apparatus for forming image information corresponding to an image of an original document on recording sheets, comprising:

timer means for counting predetermined terms continuously, sheet size sensor means for detecting a size of said recording sheets, counter means for counting the number of pages of the recording sheets on which the image information has been recorded, memory means for storing data of printing charge per sheet, preset for a predetermined range of the number of sheets according to the size of said recording sheets, calculating means connected to the timer means, sheet size sensor means, counter means and memory means, said calculating means calculating printing charge for each usage based on data of the number of printed sheets counted by said counter means and data of the printing charge per sheet preset for a predetermined range of the number of sheets according to the size of the recording sheets detected by said sheet size sensor means, said calculating means calculating a total number of pages of the printed sheets and total printing charges for each predetermined term based on the timer means, and display means for selectively displaying calculation results for said each usage, and said total number of pages and said total printing charges for the predetermined term calculated by said calculating means.

* * * * *